July 11, 1933.   C. H. CRAWFORD ET AL   1,918,019
ELECTRICAL INSTRUMENT
Filed Dec. 18, 1931

Inventors:
Craven H. Crawford,
Stephen C. Hoare.
by Charles E. Mullen
Their Attorney.

Patented July 11, 1933

1,918,019

UNITED STATES PATENT OFFICE

CRAVEN H. CRAWFORD, OF SCOTIA, NEW YORK, AND STEPHEN C. HOARE, OF MANCHESTER, MASSACHUSETTS, ASSIGNORS TO GENERAL ELECTRIC COMPANY, A CORPORATION OF NEW YORK

ELECTRICAL INSTRUMENT

Application filed December 18, 1931. Serial No. 581,928.

Our invention relates to electrical instruments and concerns particularly instruments responsive to the relationship between two alternating currents or voltages.

One object of our invention is to provide an instrument indicating the phase relationship between alternating currents or voltages of known magnitudes. Another object is to provide an indication of the polarity and magnitude of one alternating quantity with respect to another or the value of the in-phase component of one alternating quantity with respect to another. Other and further objects will become apparent as the description proceeds.

In accordance with our invention, we provide a field coil and a pair of armature coils cooperating therewith arranged to act at different angles so that the position of the armature with respect to the field depends upon the relative strength of the currents in the armature coils. The armature coils are connected in series with respect to one source of current. With respect to the other source they are connected in parallel in a circuit which includes the field coil taken in series.

Figure 1:
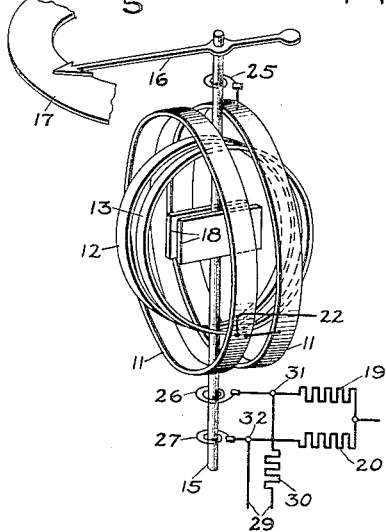
Figure 2:
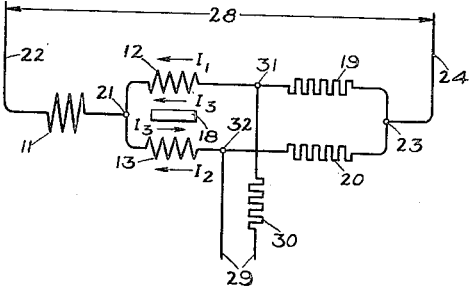
Figure 3:
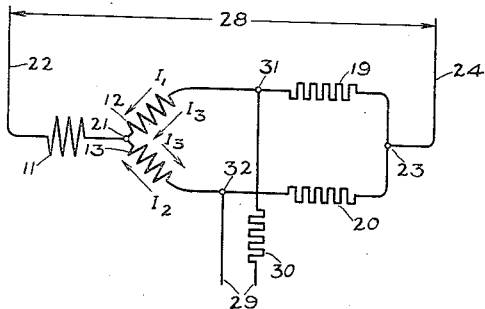
Figure 4:
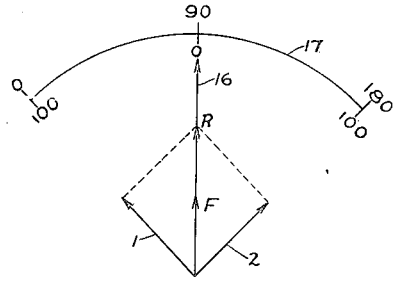
Figure 5:
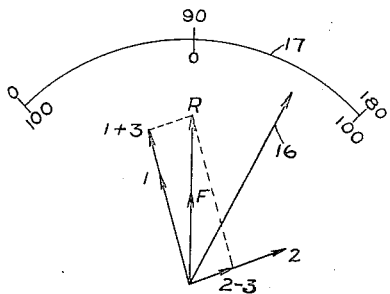
Figure 6:
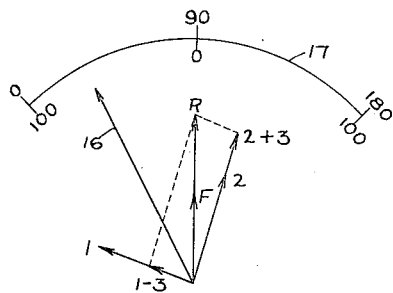

The features of our invention which we believe to be novel and patentable will be pointed out in the claims appended thereto. Our invention itself, however, will be best understood from reference to the following description taken in connection with the accompanying drawing in which Fig. 1 represents one form of our invention in perspective; Fig. 2 is a schematic diagram of the arrangement shown in Fig. 1; Fig. 3 is a schematic diagram of a modified arrangement; and Figs. 4, 5 and 6, are vector diagrams illustrating the operation of our invention.

Referring now more in detail to the drawing in which like reference characters refer to like parts throughout, we provide a pair of stationary field coils 11 connected in series to act as a single coil and a pair of movable armature coils 12, 13 attached to a shaft 15 carrying a pointer 16 cooperating with a scale 17. The armature coils 12 and 13 are so arranged that they tend to deflect the pointer 16 in opposite directions. In the arrangement shown in Fig. 3, this is accomplished by placing the coils 12 and 13 at right angles to each other. Each coil then tends to place itself parallel to the field coil 11.

In the arrangement of Figs. 1 and 2, a similar result is accomplished by providing opposed co-planar coils 12 and 13 and soft iron vanes 18 attached to shaft 15 parallel to the planes of coils 12 and 13. The vanes 18 are magnetized by the field coils 11 and tend to align themselves along the axis of coil 11. Currents flowing in coils 12 and 13 set up opposing fields at right angles to vanes 18, thereby producing a resultant field which deflects the moving coils in one direction or the other, depending upon the relative strength of the currents therein.

In either of the arrangements shown, the coils 12 and 13 are connected in series with resistors 19 and 20 respectively, and have a common terminal 21 connected to one end of field coil 11. The free end of field coil 11 is connected to lead 22. The resistors 19 and 20 also have a common terminal 23 which is connected to lead 24. It will be understood that suitable means such as the hair spring 25 is utilized to provide a connection between the stationary coil 11 and the common terminal of movable coils 12 and 13, and that likewise hair springs 26 and 27 respectively provide connections between the other ends of the movable coils and the resistors 19 and 20. Hair springs 25, 26 and 27 are preferably torsionless and serve only to conduct current. Although we prefer to make the field coils 11 and the resistors 19 and 20 stationary, and to make the armature coils 12 and 13 rotatable, it will be understood that we are not limited to this precise arrangement.

One source of alternating current 28 is supplied through leads 22 and 24 and another source of alternating current 29 is supplied through leads containing the current limiting resistor 30 and connected across the point 31 between coil 12 and resistor 19 and the point 32 between coil 13 and the resistor 20. Accordingly, coils 12 and 13 are connected in series with respect to source 29 and in parallel with respect to source 28.

In Figs. 2 and 3 the currents flowing at a given instant in coils 12 and 13 respectively, due to source 28, are represented by arrows marked $I_1$ and $I_2$, and the currents due to source 29 are represented by arrows marked $I_3$. It will be seen that the currents oppose in one armature coil and aid in the other. The values of resistance of elements 19, 20 and 30 are such in comparison with the number of turns of the coils that there is no appreciable difference in phase between the currents and the voltages causing these currents to flow. Consequently, $I_1$, $I_2$, and the current in field coil 11 will be in phase with voltage 28 and $I_3$ will be in phase with voltage 29.

Each coil will set up a magnetic flux in phase with the time vector resultant current in the coil. The armature will deflect until the space vector resultant flux of the armature is in the same direction as the flux of the field coil. However, the time vector component of flux produced by the armature coils which is not in phase with the time vector of the field flux will obviously be without effect.

Fig. 4 represents the condition when the voltage of source 29 is zero or is 90 degrees out of phase with the voltage of source 28. The armature aligns itself so that the space resultant R of fluxes 1 and 2 set up by the currents $I_1$ and $I_2$ respectively is in the same direction as the flux F set up by the field coil 11. The pointer 16 fixed to the armature is thereby brought to a definite point on the scale 17. As shown, the constants of the parallel circuits are such that fluxes 1 and 2 are symmetrical and the arrangement of the scale is such that the pointer is at the mid point of the scale. But it will be understood that we are not limited to this precise arrangement. For example, the position of the pointer may be controlled by adjusting the resistors 19 and 20 or by changing the relative number of turns of coils 12 and 13.

Fig. 5 represents the conditions when the voltage of source 29 has a component in phase with the voltage of source 28. A flux 3 is set up by current $I_3$ proportional to the in-phase component of source 29. The total flux of coil 12 is accordingly increased to 1+3 and the flux of coil 13 is decreased to 2−3. The direction of the resultant R with respect to the armature is obviously changed and the armature is rotated until R again has the direction of F, causing pointer 16 to deflect to the light. In a similar manner the pointer 16 will deflect to the left, as shown in Fig. 6, when the polarity of the in-phase component of source 29 is reversed.

It is obvious that our device is suitable for various purposes. If the effective values of the voltages or currents supplied by sources 28 and 29 are kept constant, the instrument may be calibrated to indicate the phase angles between such voltages or currents, and the upper set of figures, 0–180, of scale 17 is used. If the source 28 is used as an exciting circuit of constant potential or current, the instrument may be calibrated in volts or amperes and the pointer is read with the lower portion of scale 17 to indicate the magnitude and polarity of the component of the voltage or current of source 29 in phase with voltage or current of source 28. Similarly, the instrument may also be calibrated in percentages when used to indicate the polarity and relative magnitude of the in-phase component of voltage or current 29 with respect to voltage or current 28. When the voltages or currents in two circuits are known not to differ in phase, our device obviously may be used to indicate the relationship between the actual magnitudes of the voltages or currents. Altho we have shown instruments of the indicating type, it will be understood that our invention obviously also includes instruments of the contact making or recording type.

We have herein shown and particularly described certain embodiments of our invention and certain methods of operation embraced therein for the purpose of explaining its principle and showing its application but it will be obvious to those skilled in the art that many modifications and variations are possible, and we aim therefore, to cover all such modifications and variations as fall within the scope of our invention which is defined in the appended claims.

What we claim as new and desire to secure by Letters Patent of the United States, is:—

1. In combination with two sources of current an electrical instrument responsive to a relationship between electrical quantities in said sources, comprising a stationary current conducting coil, a pair of mechanically connected movable current conducting coils in inductive relation with said stationary coil and having a common terminal, a pair of resistors having a common terminal and connected in series respectively with said movable coils to form a series parallel circuit connected in series with said stationary coil and one of said sources of current, the second of said sources of current being connected across two points, one of which is at the connection between one of said movable coils and the resistor associated therewith, and the other of which points is at the connection of the other of said movable coils and the resistor associated therewith.

2. In combination with two independent sources of current, an electrical instrument responsive to a relationship between electrical quantities in said sources, comprising a stationary current conducting coil, a pair of mechanically connected movable current conducting coils in inductive relation with said stationary coil and electrically connected in parallel with respect to one of said sources and in series with respect to the other of said sources, said stationary coil being connected in series with said first-mentioned source.

3. In combination with two independent sources of current, an electrical instrument responsive to the relationship between electrical quantities in said sources, comprising stationary means for producing an alternating magnetic field energized by one of said sources, a pair of mechanically connected rotatable current conducting coils arranged to produce angularly displaced magnetic fields, said coils being electrically connected in parallel with respect to the current source energizing said field and in series with respect to the other of said sources of current.

4. In combination with two sources of current, an electrical instrument responsive to the relationship between electrical quantities in said sources comprising a stationary field producing element energized by one of said sources and a rotatable element carrying a vane of magnetizable material and a pair of current conducting coils parallel to said vane and arranged to produce opposing magnetic fields, said rotatable coils being connected in series with respect to the source of current energizing said stationary element and in parallel with respect to the other of said sources of current.

5. In combination with two independent sources of current, an electrical instrument responsive to the relationship between electrical quantities in said sources comprising a stationary current conducting coil, a pair of mechanically connected angularly displaced rotatable current conducting coils in inductive relation with said stationary coil, said rotatable coils being electrically connected in series with respect to one of said sources of current and in parallel with respect to the other of said sources of current, said field producing coil being connected in series with said latter source.

6. In combination with two independent sources of electric current, an instrument responsive to the relationship between electrical quantities in said sources comprising a pair of relatively rotatable elements, one of said elements comprising a field-producing coil and the other of said elements comprising a pair of mechanically connected current conducting coils electrically connected in series with respect to one of said sources and in parallel with respect to the other of said sources, said field producing coil being connected in series with said latter source.

In witness whereof, we have hereunto set our hands.

CRAVEN H. CRAWFORD.
STEPHEN C. HOARE.